United States Patent [19]
Hamilton

[11] 3,971,480
[45] July 27, 1976

[54] ROTARY ACTUATOR

[75] Inventor: Joseph R. Hamilton, Anderson, Ind.

[73] Assignee: Lynch Corporation, Anderson, Ind.

[22] Filed: June 7, 1974

[21] Appl. No.: 477,498

[52] U.S. Cl............................... 214/1 BB; 74/105; 91/463
[51] Int. Cl.².......................................... B65G 47/00
[58] Field of Search ............ 214/1 BB, 1 BT; 74/99, 74/105; 91/463, 464, 435, 436; 198/20 R; 65/260

[56] References Cited
UNITED STATES PATENTS

| | | | |
|---|---|---|---|
| 3,276,606 | 10/1966 | Marchand......................... | 214/1 BB |
| 3,362,545 | 1/1968 | Rowe................................ | 214/1 BB |
| 3,522,870 | 8/1970 | Landry et al..................... | 198/20 R |

FOREIGN PATENTS OR APPLICATIONS 706,694  3/1965  Canada............................... 91/463

*Primary Examiner*—Frank E. Werner
*Attorney, Agent, or Firm*—Allegretti, Newitt, Witcoff & McAndrews

[57] ABSTRACT

The invention specifically relates to an improved rotary actuator for operating a reciprocating member used for transferring articles from one position to another. The rotary actuator is air driven, and linkage is provided between the actuator and the reciprocating member for uniformly accelerating and decelerating the member between two positions. Cushioning of the actuator also improves the acceleration and deceleration characteristics of the actuator.

5 Claims, 9 Drawing Figures

ROTARY ACTUATOR

BACKGROUND OF THE INVENTION

This invention is specifically related to an improved means for operating an article transfer mechanism adapted for rapid, intermittent, reciprocating motion. In one particular application, the improvement of this invention is adapted for use with a takeout device for transferring glass articles from a glass-making machine to a conveyor.

In glass-making machines, a rotary table is provided with a multiplicity of stations supporting molds for receiving molten glass which is dropped as separate gobs into the molds at a specific station from above the table. The table is rapidly, intermittently rotated, or indexed, so that specific stations disposed along the perimeter of the table are moved swiftly and smoothly to specific, predetermined locations called stations. After the glass-making operation is completed, the glass article is removed from the mold at a takeout station where a takeout device grasps the article and transfers it to a location away from the table, such as a conveyor.

Prior art takeout devices include article-grasping jaws slidably mounted for linear, reciprocal movement toward and away from the rotating table. This type of device is usually operated pneumatically, with pressure being applied to cylinders to advance and retract the jaws mounted on slide rails between the article pickup and article drop-off positions.

Unfortunately, it is difficult to obtain smooth acceleration and deceleration between the extreme positions of prior takeout devices. The operational speed of prior glass-making machines was substantially limited due to the nonuniform acceleration/deceleration characteristics of the takeout device. This problem is increased by the fact that the reciprocating takeout device must be brought temporarily to a stop during the article pickup and article drop-off operations. The speed limitations caused by the prior takeout devices decreased the total production capacity and cost efficiency of prior machines.

Moreover, it is difficult to accurately position prior takeout devices at the desired locations and still provide a high-speed takeout device capable of operating smoothly and uniformly. Accurate positioning of the takeout device is particularly important in conjunction with a glass-making machine since improper location can result in destruction of the glass article by the article-gripping jaws.

In prior pneumatic systems, an arrangement of stop members can be devised to abut the takeout mechanism at appropriate locations. In this type of system the takeout mechanism physically contacts against the stop member, creating additional, detrimental machine vibrations and noise and generally detracting from the overall smoothness of operation of the glass-making system. Prior art devices significantly sacrifice one of the desired qualities of speed and smoothness of operation to obtain the other. This invention utilizes a rotary actuator and linkage, adapted to optimize both characteristics, to produce a dramatically smoother system capable of operating speeds substantially higher than the prior art systems.

SUMMARY OF THE INVENTION

The present invention is generally related to improved means for operating an article transfer mechanism adapted to be driven in a rapid, intermittent, reciprocating fashion.

The improved operating means are adapted for use with an article transfer mechanism slidably mounted for rapid, intermittent, reciprocating movement between an article pickup position and an article drop-off position. The invention includes a rotatable drive member, means for rotating the rotatable drive member, and a drive link connected between the drive member and the article transfer mechanism. The drive link is pivotally connected to the takeout means and is also pivotally connected to the drive member at a point radially outward from the axis of rotation of the drive member, whereby rotational motion of the drive member causes the takeout means to be linearly reciprocated between positions for article pickup and article drop-off and uniformly accelerated and decelerated between the two positions.

A further feature of the invention is pneumatic means for cushioning a rotary actuator operating between a first position associated with article pickup and a second position associated with article drop-off.

Means are provided for sensing the position of the actuator. Valve means responsive to the sensing means are provided for decreasing the operating speed of the actuator when the actuator approaches the pickup or drop-off position.

In a preferred embodiment of the invention, the sensing means includes cam means, connected for rotation with the rotary actuator, and cam follower means associated with the cam. The valve means are operably connected to the follower means for constricting the exhaust of air from the rotary actuator when the actuator approaches pickup or drop-off positions.

It is an overall object of the present invention to provide in an article transfer mechanism a means for operating the mechanism which is simple and economical to construct and which will smoothly and swiftly reciprocate the article transfer mechanism between an article pickup position and an article drop-off position.

It is also an object of the present invention to provide an improved means for operating an article transfer mechanism by which the mechanism may be operated smoothly and efficiently at relatively high rates of speed.

It is a further object of the present invention to provide an improvement in an article transfer mechanism by which the mechanism may be operated at high rates of speed and yet avoid jarring movements and vibrations normally attendant with such machines operated at high rates of speed.

It is still a further object of the present invention to provide a means for operating the article transfer mechanism which utilizes a rotary actuator, a lever arm connected to the drive shaft of the actuator, and a drive link connected between the lever arm and the transfer mechanism by which the rotary motion is translated into linear, reciprocating motion having uniform acceleration and deceleration in which the transfer mechanism is momentarily brought to a halt at the article pickup position and article drop-off position.

It is a further object of the present invention to provide a means for operating an article transfer mechanism by which the transfer mechanism may be easily and precisely located at predetermined article pickup and drop-off positions.

Still a further object of the present invention is to provide cushion means for gradually decreasing the operating speed of a rotary actuator driving the takeout device when the actuator approaches pickup or drop-off position.

Still another object of the present invention is to provide a device capable of operating a reciprocating article transfer mechanism in a way which optimizes both speed and smoothness of operation.

These and other objects of the present invention will be more apparent from a review of the detailed description of the preferred embodiment and the claims which follow.

BRIEF DESCRIPTION OF THE DRAWINGS

There follows a description of the drawings showing a presently preferred embodiment of the present invention in which like numerals refer to like elements and in which.

DETAILED DESCRIPTION OF THE PREFERRED EMBODIMENT

Figure 1:
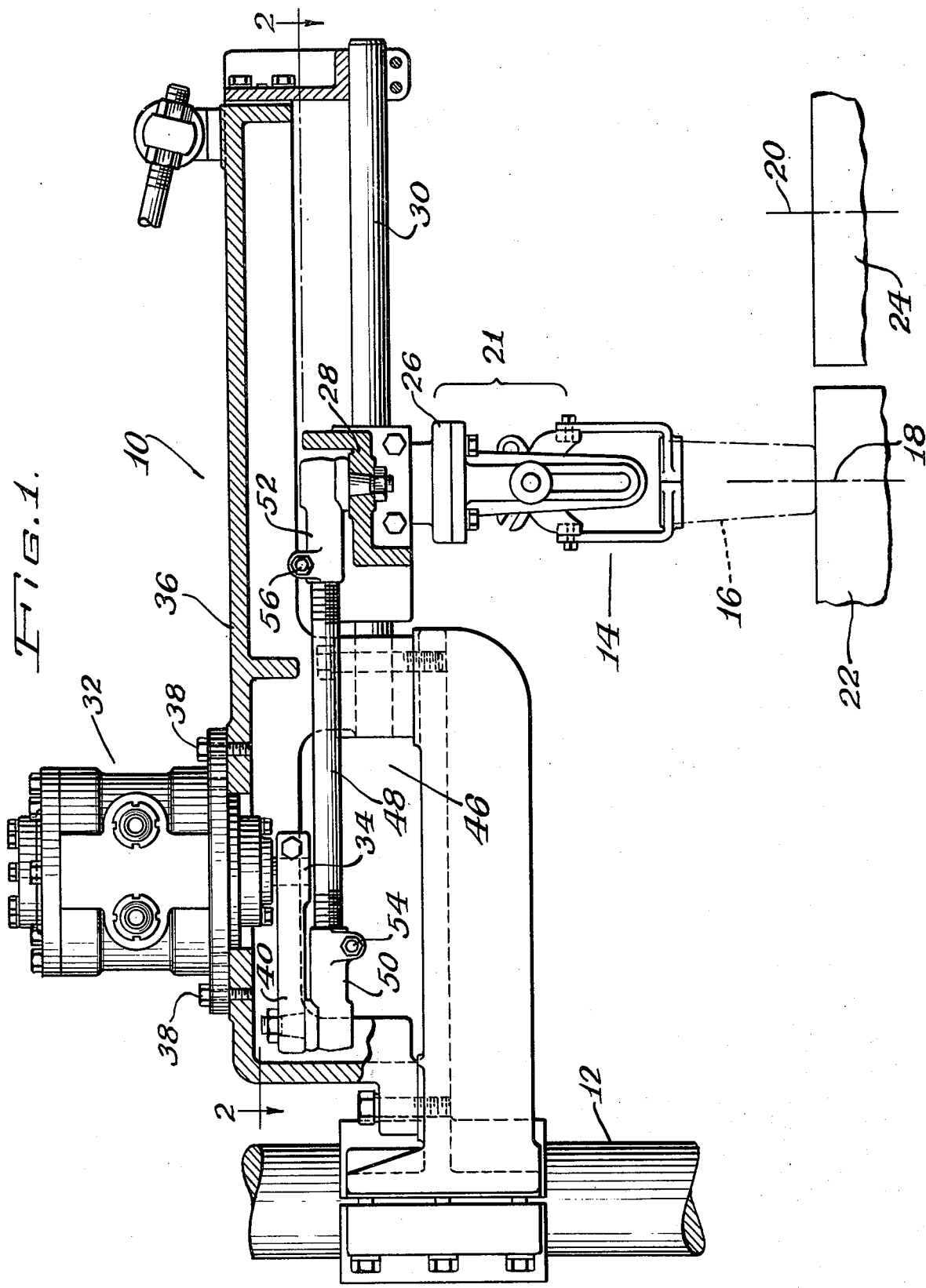
FIG. 1 is a side cross-sectional view of the article transfer mechanism of this invention.

Referring to FIG. 1, there is shown generally an article transfer mechanism 10 which is mounted on a support shaft 12. The article transfer mechanism 10 includes two pairs of article-gripping jaws 14 (only one shown in FIG. 1). The jaws 14 are adapted to grip an article such as a glass container 16 located at an article pickup position 18 and move the article 16 to a second, drop-off position 20. Means 21 for operating the jaws 14 are also provided. The jaw operating means 21 will not be described in detail since they do not form a central part of this invention and since a variety of such devices are well known in the art.

In a particular application for which this invention is suited, the article transfer mechanism 10 is a takeout device for use with a glass-making machine and moves a glass article 16 from a mold (not shown) on a table 22 to a conveyor 24. The table 22 carries a plurality of glass-forming molds about the periphery of the table and is indexed from one glass-forming station to another until the glass article 16 is formed. The article 16 is then removed by a takeout device to the conveyor 24.

Figure 2:
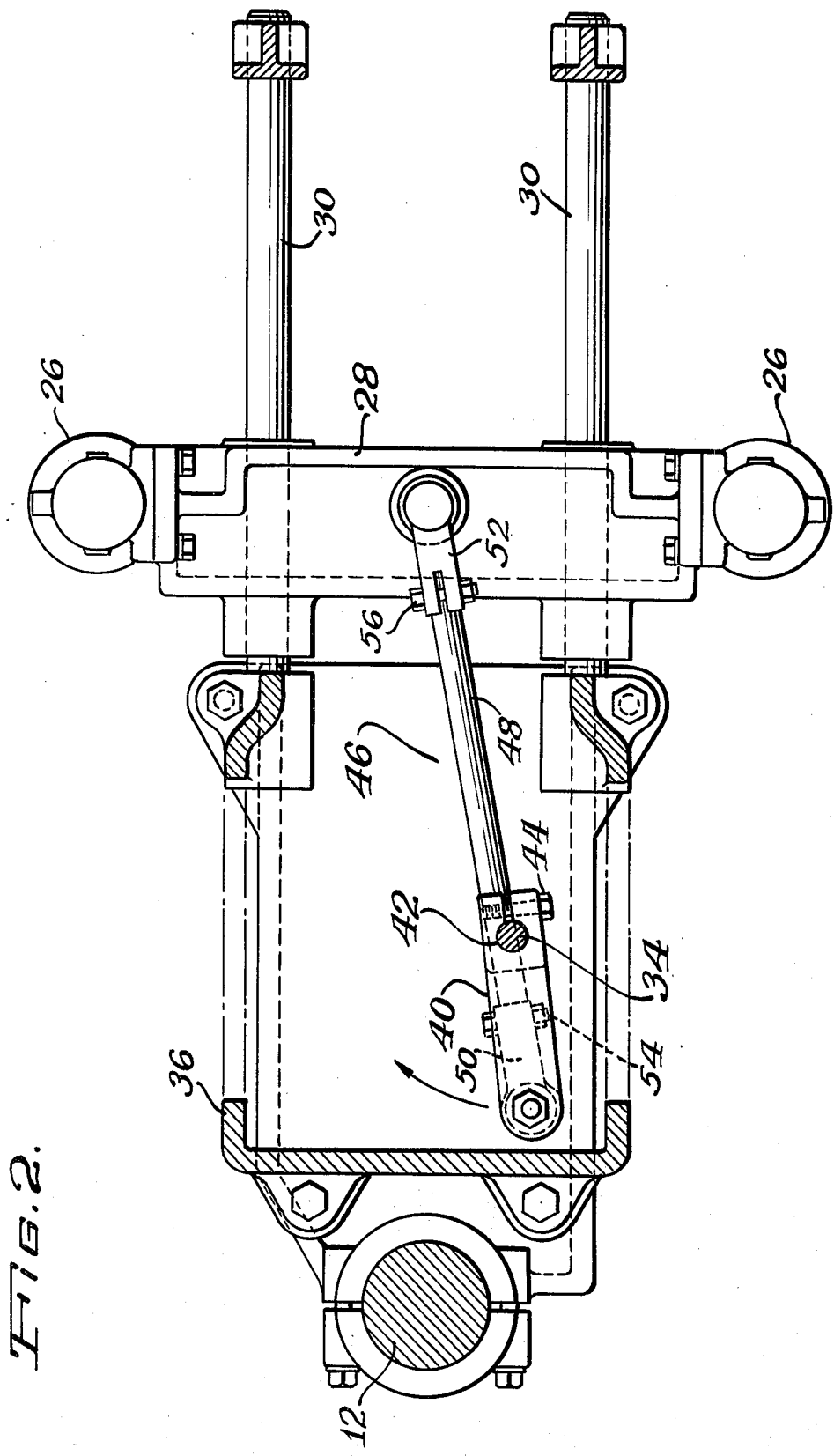
FIG. 2 is a top cross-sectional view of the mechanism shown in FIG. 1, taken substantially along the lines 2—2.
Figure 3:
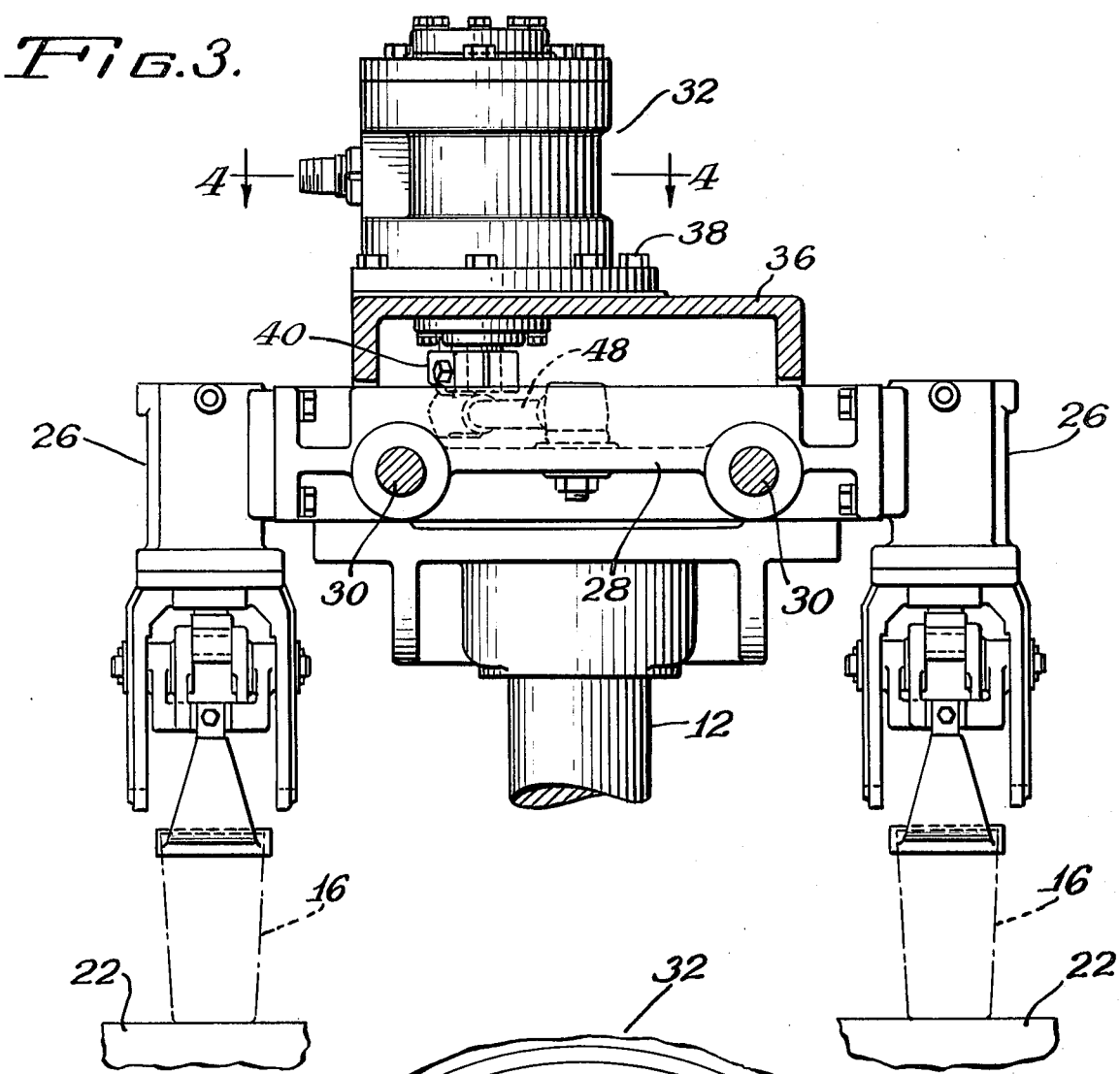
FIG. 3 is a second side cross-sectional view of the mechanism of FIG. 1, taken substantially along the lines 3—3.

Referring now to FIGS. 1, 2 and 3, the jaw operating means 21 each include a jaw retaining frame 26. The jaw retaining frames 26 are connected to a bracket 28 which is slidably mounted for reciprocal movement on a pair of slide rails 30. Movement of the bracket 28 along the slide rails 30 causes the jaws 14 to move from article pickup position 18 to article drop-off position 20. The transfer mechanism 10 also includes means for rotating a drive member. In the preferred embodiment the rotating means is a rotary actuator 32 having a drive shaft 34 extending therefrom. The rotary actuator 32 is connected to a support bracket 36 by means of hexagonal headed screws 38. A passage is provided in the bracket 36 through which the drive shaft 34 extends. When the rotary actuator 32 is operated, the drive shaft 34 is rotated. The article-gripping jaws 14 are connected to the rotary actuator as will be described.

A lever arm 40 is rigidly connected to the drive shaft 34. The lever arm 40 is a rigid, metal member and includes a passage 42 defined therein for receiving the drive shaft 34. A clamp means in the form of a threaded screw 44 is provided on one end of the lever arm 40 to tighten the lever arm 40 onto the drive shaft 34 by varying the size of the passage 42.

The means for connecting the rotary acttuator to the jaws 14 also includes a drive link 46 having a cylindrical shaft 48, a first collar 50 and a second collar 52. The collars 50 and 52 are threadably connected to the ends of the cylindrical shaft 48. Threaded screws 54 and 56 secure the collars 50 and 52 to the shaft 48. Passageways (not shown) are defined in the collars 50 and 52. The passageways may be varied in size by tightening the screws 54 and 56 to clamp snugly about the ends of the cylindrical shaft 48. Collar 50 is pivotally connected to the outer end of the lever arm 40. Collar 52 is pivotally connected to the bracket 28 which, in turn, is connected to the article transfer jaws 14.

Referring now more specifically to FIG. 2, when the drive shaft 34 is rotated by the rotary actuator 32, the lever arm 40 is rotated about the axis of rotation of the drive shaft 34. The drive link 46 is connected through the lever arm 40 to the drive shaft 34 at a point radially outward from the axis of rotation of the drive shaft 34. When the rotary actuator 32 is rotated, drive link 46 is rotated and translated, causing the jaws 14 to be linearly translated.

In FIG. 2, the article transfer jaws 14 are in the retracted position above the table 22. This represents the article pickup position. As the drive shaft 34 is rotated clockwise, the drive link 46 is rotated clockwise about its rotational axis on bracket 28 and is translated toward the right. This movement of the drive link 46 causes the bracket 28 to be translated toward the right along the slide rails 30. When the drive shaft 34 and lever arm 40 are rotated almost 180° in a clockwise direction from the position shown in FIG. 2, the bracket 28 and article transfer jaws 14 are translated toward the right to the article drop-off position 20. Reverse rotation of the shaft 34 and lever arm 40 in the counterclockwise direction results in the return movement of the drive link 46 and bracket 28 attached thereto toward the left to return from the article drop-off position at 20 to the article pickup position at 18.

Figure 4:
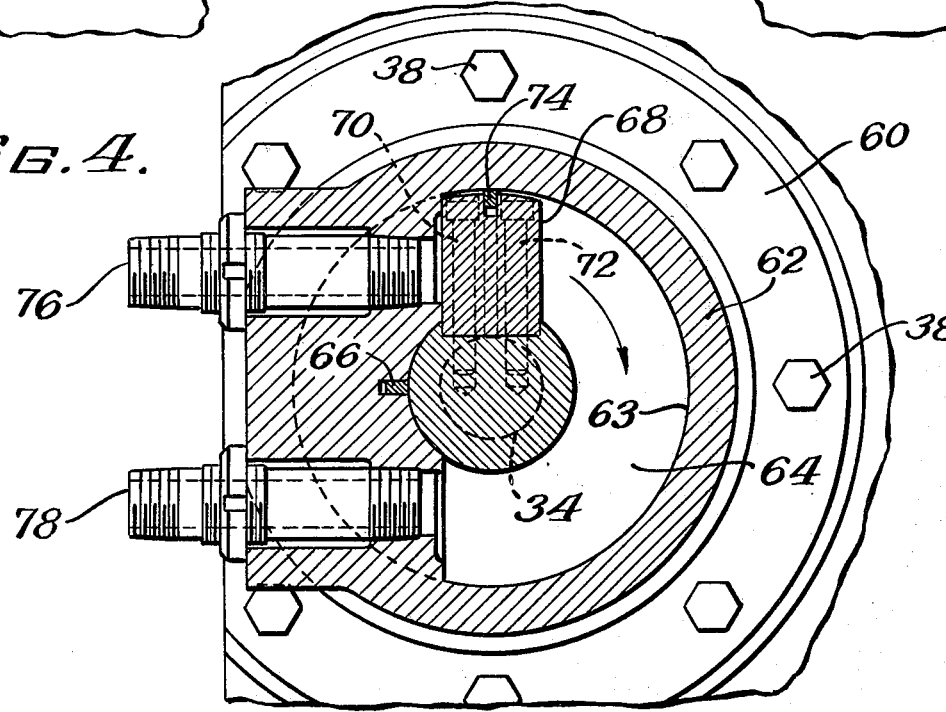
FIG. 4 is a top cross-sectional view of the rotary actuator shown in FIG. 3, taken substantially along the lines 4—4.

The smooth and efficient operation of the article transfer jaws 14 by the drive link 46, lever arm 40 and drive shaft 34 allows the takeout mechanism of this device for use in the glass-making machine to be operated smoothly and efficiently at extremely high rates of speed. This mechanism provides an especially desirable combination of high speed operation and uniform acceleration and deceleration.

the rotary actuator 32 is shown in greater detail in FIG. 4. The rotary actuator includes an actuator body 60 having a horseshoe-shaped collar 62 on the interior of the body 60. A portion of the collar 62 is annular in cross-sectional shape and has an inner surface 63 which defines a chamber 64 within the body 60. The drive shaft 34 is mounted for rotation within the actuator body 60, and a wiper 66 is provided in the actuator body 60 and positioned to contact the outer surface of the drive shaft 34.

A vane 68 is rigidly connected to the drive shaft 34 by means of screws 70 and 72. Rotation of the vane 68 rotates the drive shaft 34. A wiper 74 on the vane 68 contacts the inner surface 63 of the collar 62 which defines the chamber 64. Ports 76 and 78 are defined within the actuator body 60 and communicate with the chamber 64.

In the position shown in FIG. 4, pressurized air is supplied to the port 76 and is exhausted from the port 78 in order to drive the vane 68 and drive shaft 34 connected thereto in a clockwise direction. On the return stroke, pressurized air is supplied to the port 78 and exhausted from the port 76 to drive the vane 68 and drive shaft 34 counterclockwise. During operation, the vane 68 and drive shaft 34 are rotated back and forth in 180° arcs clockwise and then counterclockwise. Pneumatic means are provided for supplying and exhausting air to and from the ports 76 and 78 so as to operate the rotary actuator 32 between a first position, associated with article pickup, and a second position, associated with article drop-off.

Figure 6:
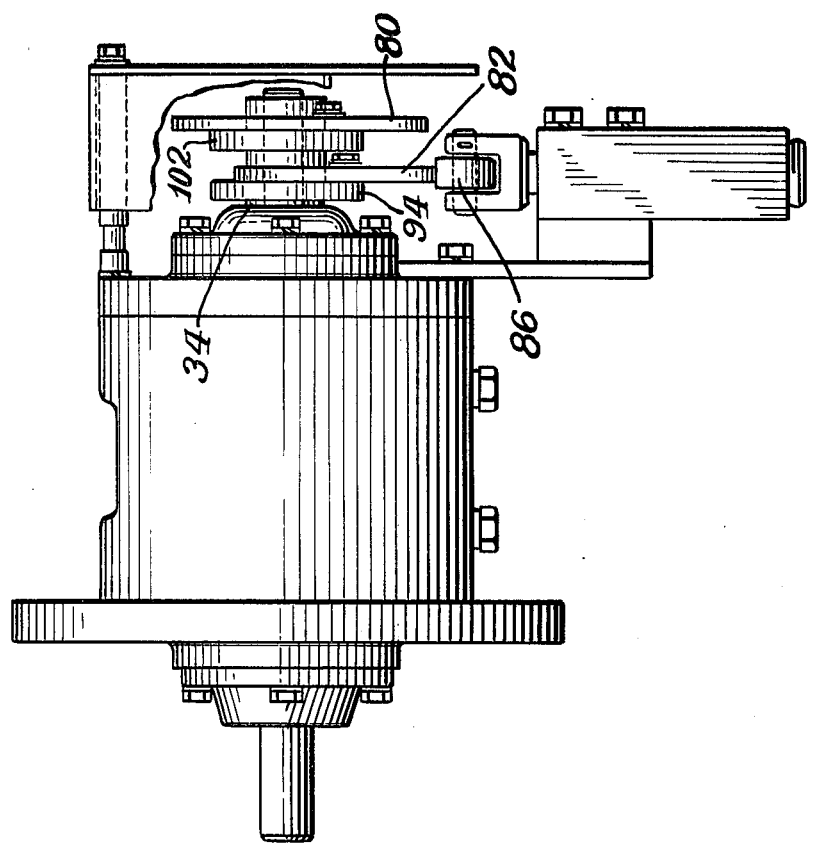
FIG. 6 is a side relief view of the rotary actuator of FIG. 5.
Figure 5:
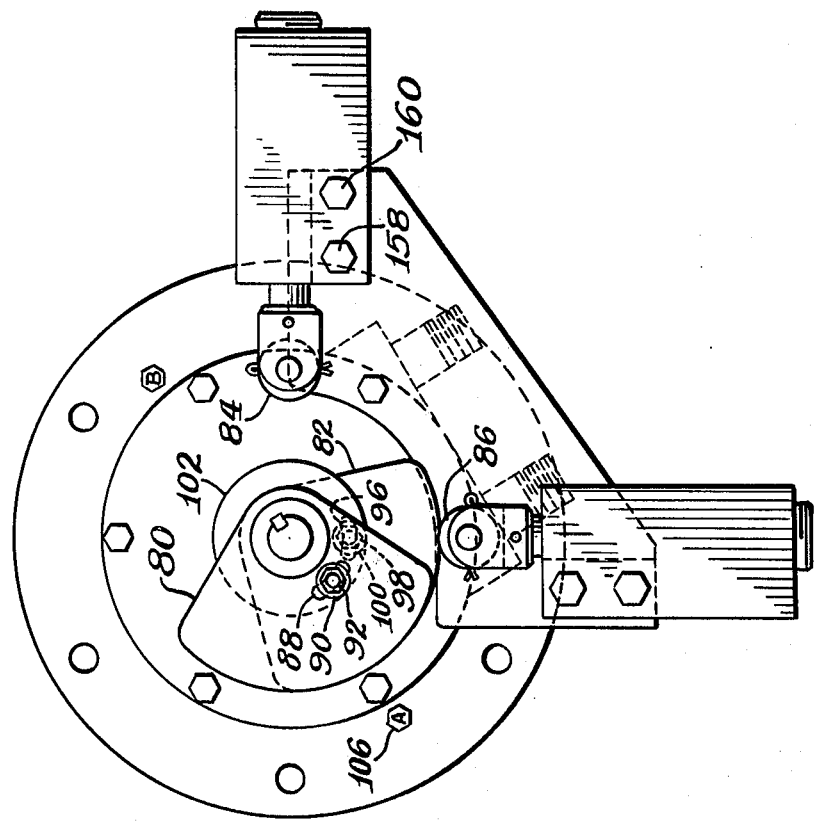
FIG. 5 is a top breakaway view of an alternative embodiment of the rotary actuator of this invention.

As an added feature of this invention, an alternative embodiment of the rotary actuator includes cushion means for the rotary actuator. This cushion means includes means for sensing the position of the drive shaft 34 and valve means responsive to the sensing means for decreasing the operating speed of the drive shaft 34 when the shaft 34 approaches the pickup or drop-off position. Referring to FIGS. 5 and 6, showing the preferred embodiment of the cushion means, the sensing means includes a first cam 80 and a second cam 82, together with associated cam followers 84 and 86. The cams 80 and 82 are connected to the drive shaft 34 of the rotary actuator 32. As will be explained more fully later, the cams 80 and 82 and cam followers 84 and 86 cooperate with valve means to control the exhaust of air from the ports 76 and 78.

Means are provided on the cams 80 and 82 for adjusting their position relative to the drive shaft 34. The adjusting means includes a slot 88 defined on cam 80 and an associated washer 90 and end cap screw 92. A cam support 94 is connected to the drive shaft 34 for rotation with shaft 34. The cam support 94 abuts the cam 80. The screw 92 is connected through the slot 88 of the cam 80 to the cam support 94. Loosening of the end cap screw 92 allows the cam 80 to be adjusted within a latitude provided by the dimension of the slot 88.

The cam 82 also includes a similar slot 96. An end cap screw 98 and washer 100 connect the cam 82 to a cam support 102. The cam 82 is adjustable in the same manner as the cam 80. In the position shown in FIG. 5, the axis line 104 designates the position of the vane 68. When the drive shaft 34 is rotated counterclockwise as shown in FIG. 5, the vane 68 will stop at the position shown by the axis line 106.

Figure 7:
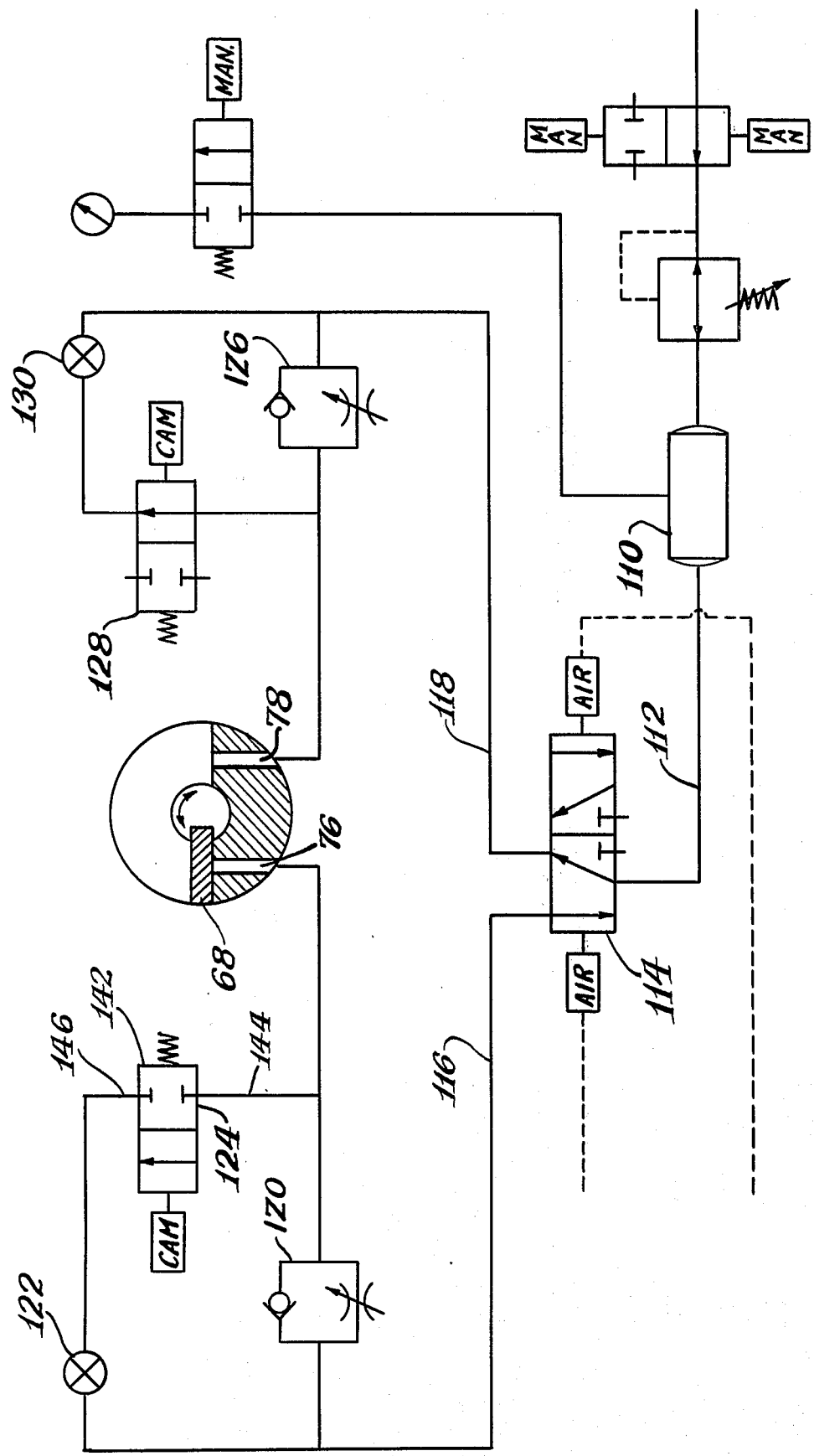
FIG. 7 is a schematic diagram of the pneumatic circuitry associated with the rotary actuator of FIG. 5.

The function of the cams 80 and 82 and cam followers 84 and 86 can be more fully understood by reference to the schematic diagram of FIG. 7. A regulated supply of pressurized air 110 is connected to a main input line 112. The air is then diverted, by means of valve 114, to one or the other of supply/exhaust lines 116 and 118 which are connected to valve 114. The vane 68 as shown in FIG. 7 has just come to rest against the opening of port 76 which is connected to line 116. The other port 78 is connected to line 118.

Between the port 76 and line 116 is an adjustable ball check valve 120. The ball check valve 120 is connected in the pneumatic circuit to pass air unobstructed thereough towards the right, and to impede the passage of air towards the left to a degree variable by adjustment of the ball check valve 120. In parallel with ball check valve 120 are a gate valve 122 and a cam-controlled open-closed trip valve 124. Valves 122 and 124 are connected in series.

Between the port 78 and line 118 is an adjustable ball check valve 126 connected to pass air unobstructed towards the left and to provide a restriction to the passage of air towards the right, with degree of restriction being variable by adjustment of the ball check valve 126. In parallel with the ball check valve 126 are a cam-controlled open-closed trip valve 128 and a gate valve 130. Valves 128 and 130 are connected in series.

Figure 8:
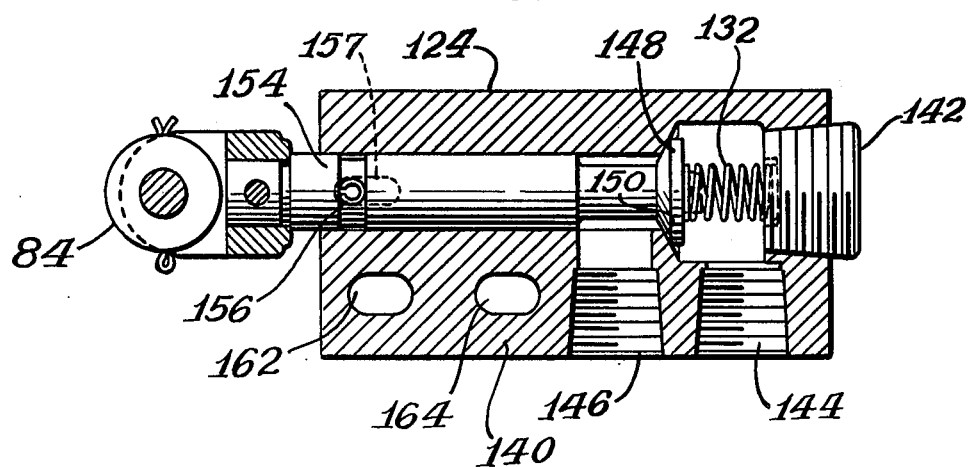
FIG. 8 is a detailed, sectional view through a cam-controlled open-closed trip valve used in the pneumatic circuitry illustrated in FIG. 7.

The valve 124 is identical to the valve 128 and a description of the valve 124 will therefore suffice for both. Referring to FIG. 8, the valve 124 includes a valve body 140 having a port plug 142, a main port 144, and side port 146. Main port 144 is connected to the rotary actuator port 76. Side port 146 is connected to the gate valve 122. A disk-shaped valve member 148 is provided in a valve seat 150 and is biased against the seat 150 by a spring 152. The cam follower 84 is operably connected to the valve member 148 by means of a valve-operating arm 154 integral with the valve member 148. When the cam follower 84 rides against the cam 80, the follower 84, arm 154 and valve member 148 are moved towards the right, thus permitting the passage of air between the port 144 and the port 146.

A roll pin 156 is press-fit into arm 154, coinciding with an elongated slot 157 in order to fix and maintain the proper radial position of cam follower 84. The valve assembly may be adjustably positioned relative to the cam 80 by loosening mounting screws 158 and 160 (FIG. 5) which are journaled in a pair of elongated slots 162 and 164, respectively. By adjusting the position of the valve assembly, the degree of restriction of air flow through the valve 124 is varied.

Referring again to FIG. 7, the vane 68 has just come to rest at its extreme left-hand position against the opening of the port 76. When the vane 68 begins to function again, the valve 114 will be switched to supply air to line 116 and exhaust air from line 118. Pressurized air will pass unimpeded through the ball check valve 120 to the port 76 to drive the vane 68 clockwise. During the 0° to 90° movement of the vane 68 in the clockwise direction, the valve 128 permits free passage of air through the valve 128 and the gate valve 130 to freely exhaust air from the port 78 to the line 118. When the vane 68 passes a predetermined point, in this case the 90° position, the cam 82 moves against cam follower 86, closing the valve 128, thus requiring air exhausted from the port 78 to be exhausted through the ball check valve 126 to the line 118 and out of the system through valve 114. Adjustment of the ball check valves 124 and 128 will vary the degree of restriction of the flow of air from the actuator chamber 64. In this manner, the speed of the vane 68 and drive shaft 34 are decreased during the second half of the approximately 180° rotation of the vane 68 and vane 68 is cushioned for smooth and controlled deceleration.

After the vane 68 has completed its clockwise rotation, the valve 114 is shifted to supply air to line 118 and to exhaust air from line 116. During the first half of counterclockwise rotation, from the 180° position to the 90° position, the valve 124 freely passes air through the valve 124 to the gate valve 122. When the vane 68 passes the 90° position, going in the counterclockwise direction, the cam operates valve 124 to prohibit air passage therethrough, shunting the air through the adjustable ball check valve 120. As has been explained, this valve may be adjusted to provide the desired degree of exhaust air restriction. The air is then exhausted from line 116 through valve 114 out of the system. Accordingly, during the first half of each 180° rotation of the vane 68, the air is exhausted freely through the exhaust port 76 or 78, whichever the case may be. During the second half of that 180° rotation, the air is exhausted in an impeded fashion, through the adjustable ball check valve 120 or 126, whichever the case may be. Accordingly, maxiumum acceleration is provided during the first phase of the rotation, and a cushioned deceleration is provided during the second half of the rotation, to bring the vane 68 to a smooth and controlled stop. The gate valves 122 and 130 are used to balance the exhaust flow from the rotary actuator 32 with the incoming air to the actuator 32. In this manner, the rotation of the vane 68 will remain constant until the action of the gate valve 122 or 130 is removed from the system by the cam-controlled valve 124 or 128.

Figure 9:
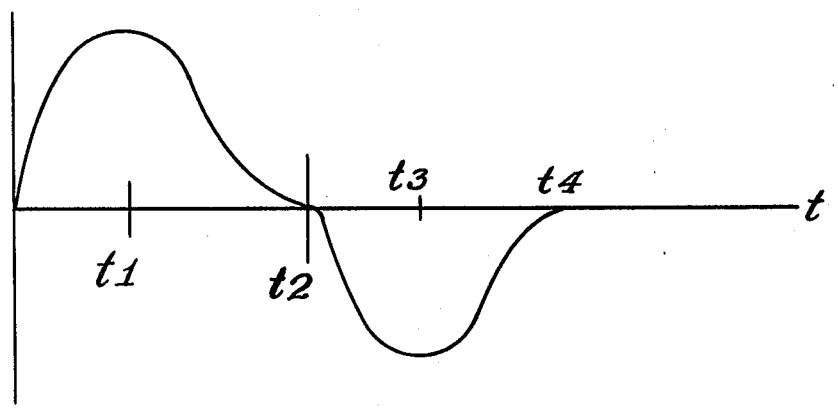
FIG. 9 is a graph of the linear speed of the article-handling portion of the mechanism of this invention.

Both the linkage and cushion features of this invention cooperate to provide an article transfer mechanism which optimizes both speed and smoothness of operation. The optimization of these two important qualities of an article transfer mechanism is shown on the graph of FIG. 9, which is an approximation of the linear speed of the article transfer jaws 14 with both the linkage and the cushioning means of this invention. The positive valves of the linear velocity represent movement of the article jaws 14 towards the right, as shown in FIG. 1, and the negative values indicate movement towards the left. During the first half of the jaw movement towards the right ($t_0$–$t_1$), the velocity of the jaws increases in a smooth and controlled fashion approximated by a sinuoidal waveform. The sinusoid is produced by the action of the drive line 46 and the bracket 28 mounted for linear movement on slide rails 30. During this phase of movement, the air is exhausted freely without being impeded by a ball check valve. During the second half of this cycle ($t_1$–$t_2$), in which the vane 68 approaches its 180° position against port 78 of the rotary actuator, the waveform is somewhat concave, due to the action of the ball check valve which restricts the exhaust of air from the rotary actuator. Vane 68 and jaws 14 are thus brought to a more smoothly controlled halt at the 180° position. During the first half of the return cycle ($t_2$–$t_3$), the jaws 14 again move with a velocity approximated by a sinusoid, and during the second half of the return cycle ($t_3$–$t_4$) the waveform is again somewhat concave, with the jaws 14 having a smooth and controlled deceleration.

While in the foregoing there have been described several preferred embodiments of this invention, it should be understood that the embodiments are merely illustrative of the principles of this invention and that modifications may be made to these embodiments without departing from the true spirit and scope of the invention.

What is claimed is:

1. In an article transfer mechanism slidably mounted for rapid intermittent, reciprocating movement between an article pickup position and an article drop-off position, an improved means for moving said article transfer mechanism, comprising, in combination:
    a rotatable, reciprocal drive member including a drive shaft,
    air driven rotary actuator means for rotating said rotatable, reciprocal drive member,
    a drive line pivotally connected to said article transfer mechanism and pivotally connected to said drive member at a point radially outward from the axis of rotation of the drive shaft whereby rotational motion of said drive shaft causes said article transfer mechanism to be linearly reciprocated between said positions for article pickup and drop-off, and
    means for controlling the speed, acceleration and deceleration of movement of said rotatable, reciprocal drive member and of said article transfer mechanism between said article pickup and drop-off positions whereby the speed and smoothness of operation of said mechanism are optimized.

2. The invention as set forth in claim 1 wherein the drive link includes means for varying the effective length between the axis of rotation about which the drive link pivots with respect to said drive member and the axis of rotation about which the drive link pivots with respect to the article transfer mechanism, whereby the location of said extreme positions for pickup and drop-off may be varied by varying said effective length.

3. In a glass making machine carrying a plurality of glass molds on a table, said table adapted for rapid, intermittent rotation, said machine including an article transfer mechanism reciprocable toward said table for article pickup, and away from said table for article drop-off, said article transfer mechanism having means for grasping glass articles from said molds and transferring said glass articles from said table to another location, an improved means for operating said article transfer mechanism, comprising, in combination:
    a rotary, reciprocal actuator means having a rotatable, reciprocal drive shaft extending outwardly therefrom,
    an actuator support member having a passage therethrough, said rotary actuator means connected to said support member with said drive shaft extending through the passage of said support member,
    a lever arm rigidly connected to said drive shaft and extending radially outwardly therefrom,
    a drive link pivotally connected at one portion thereof to said lever arm and pivotally connected at another portion thereof to said article transfer mechanism, whereby rotation of the drive shaft by the rotary actuator reciprocates the article transfer mechanism toward and away from the table for article pickup and drop-off, and, means for controlling the speed, acceleration, and deceleration of movement of said rotary, reciprocal actuator means, and of said article transfer mechanism between said article pick-up and said article drop-off position whereby said article transfer mechanism is controllably accelerated and decelerated between said pickup and drop-off positions, and is brought to a momentary standstill at said positions, whereby the speed and smoothness of operation of said mechanism are optimized.

4. In an article transfer mechanism slidably mounted for rapid intermittent, reciprocating movement between an article pickup position and an article drop-off position, an improved means for moving said article transfer mechanism, comprising, in combination:

a rotatable, reciprocal drive member, means for operating said rotatable, reciprocal drive member between a first position, associated with said article drop-off, a drive link pivotally connected to said article transfer mechanism and pivotally connected to said drive member at a point radially outward from the axis of rotation of the drive member whereby rotational motion of said drive member causes said article transfer mechanism to be linearly reciprocated between said positions for article pickup and article drop-off, and means for controlling the speed, acceleration and deceleration of movement of said rotatable, reciprocal drive member, and of said article transfer mechanism, between said article pick-up position and said article drop off-position, whereby the speed and smoothness of operation of said mechanism are optimized, said controlling means including means for sensing the rotational position of said rotatable, reciprocal drive member and also including means responsive to said sensing means for decreasing the operating speed of said drive member when said drive member approaches either said first position or said second position.

5. In an article transfer mechanism slidably mounted for rapid intermittent, reciprocating movement between an article pickup position and an article drop-off position, an improved means for moving said article transfer mechanism comprising, in combination:

a rotatable reciprocal drive member, means for rotating said rotatable, reciprocal drive member, a drive link pivotally connected to said article transfer mechanism, a rigid lever arm rigidly connected to said drive member and extending radially outwardly therefrom and being pivotally connected to said drive link at a point on said lever arm outwardly from the axis of rotation of said drive member, whereby rotation of said drive member causes rotation of said lever arm, which acts through said drive link for linearly reciprocating said article transfer means at a rate sinusoidally related to the rotational speed of said drive member and also being related to the distance between the axis of rotation of said drive member and the axis of rotation about which said drive link pivots with respect to said lever arm, means for sensing the rotational position of the rotatable drive member, and means responsive to said sensing means for decreasing the operating speed of said drive member when said member approaches said first position or said second position.

* * * * *